United States Patent
Singhal

(10) Patent No.: US 10,061,802 B2
(45) Date of Patent: Aug. 28, 2018

(54) METHOD AND SYSTEM FOR EFFICIENT PERFORMANCE PREDICTION OF STRUCTURED QUERY FOR BIG DATA

(71) Applicant: Tata Consultancy Services Limited, Mumbai (IN)

(72) Inventor: Rekha Singhal, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 527 days.

(21) Appl. No.: 14/663,647

(22) Filed: Mar. 20, 2015

(65) Prior Publication Data
US 2016/0140171 A1    May 19, 2016

(30) Foreign Application Priority Data
Nov. 14, 2014    (IN) .......................... 3600/MUM/2014

(51) Int. Cl.
*G06F 17/30* (2006.01)

(52) U.S. Cl.
CPC .. *G06F 17/30442* (2013.01); *G06F 17/30477* (2013.01)

(58) Field of Classification Search
CPC ..................... G06F 17/30477; G06F 17/30442
USPC ........................................................ 707/713
See application file for complete search history.

(56) References Cited

U.S. PATENT DOCUMENTS

| | | |
|---|---|---|
| 8,341,178 B2 | 12/2012 | Belknap et al. |
| 8,386,508 B2 | 2/2013 | Krishnamoorthy et al. |
| 9,639,576 B2 * | 5/2017 | Tokuda et al. ................. 707/713 |
| 2008/0288446 A1 * | 11/2008 | Hu et al. ............................ 707/2 |
| 2015/0112965 A1 * | 4/2015 | Tokuda et al. ................ 707/718 |

OTHER PUBLICATIONS

Rekha Singhal et al., Extrapolation of SQL Query Elapsed Response Time at Application Development Stage, 2012, IEEE, 035-041.*
Wentao Wu, Yun Chi, Hakan Hacigumus, Jeffrey F. Naughton; "Towards Predicting Query Execution Time for Concurrent and Dynamic Database Workloads"; Department of Computer Sciences, University of Wisconsin, NEC Laboratories, U.S.A., pp. 925-936, 12 pages.

* cited by examiner

*Primary Examiner* — Jean B Fleurantin
(74) *Attorney, Agent, or Firm* — Finnegan, Henderson, Farabow, Garrett & Dunner LLP

(57) ABSTRACT

Disclosed is a system for predicting an Elapsed Response Time (ERT) of a query to be executed in a production database. The system includes a database emulator module for creating an emulated database based on empty schema derived by extrapolating statistical information from the development environment. The system also includes an execution plan generation module for generating a query execution plan of the query. The system further includes a query classifying module for classifying each sub-query based on the operational parameters into at least one of a full table scan, a primary index scan, a fast index scan and a non-unique index scan. The system also includes a time determination module for executing each sub-query on the emulated database to determine an Input Output (IO) access time and an operator time. Moreover, the system includes an ERT prediction module for predicting the ERT of the query to be executed in the production database based on the IO access time, the operator time, and a network time.

14 Claims, 5 Drawing Sheets

METHOD AND SYSTEM FOR EFFICIENT PERFORMANCE PREDICTION OF STRUCTURED QUERY FOR BIG DATA

PRIORITY INFORMATION

This U.S. patent application claims the benefit of priority under 35 U.S.C. § 119 to India Patent application No. 3600/MUM/2014, filed on Nov. 14, 2014. The aforementioned application is incorporated herein by reference in its entirety.

TECHNICAL FIELD

The present disclosure described herein, in general, relates to a database management system, and more particularly to the database management system for predicting elapsed response time of a query to be executed in a production database.

BACKGROUND

Due to large volume of data, big data paradigm has resulted in impacting performance of an application. The performance of the application has been evaluated based upon variety of parameters. One of the critical parameter that facilitates to evaluate the performance is a response time of a query. For a structured database application, the response time of the query is tested against a subset of the large volume of data deployed in a production database. It is generally observed that sometimes the response time in such database application may increase non-linearly with increase in size of the data over a period of time. The non-linear increase in the response time may in turn lead to violation of the performance guarantee provided to users of the application.

This non-linear increase in the response time is because of conventional testing techniques being adopted for testing the queries. The conventional testing techniques involve testing the queries on the subset of the large volume of the data. In order to evaluate the performance using the conventional testing techniques, the application may require various resources such as storage servers capable of storing trillions of records. But the deployment of such resources for evaluating the performance may lead to incur huge cost. Moreover, even if the resources are arranged, testing the queries against the large volume of the data may increase evaluation time and thereby delaying deployment of the application.

In order to overcome the aforementioned lacunae, various statistical machine learning based models have been proposed in the art which builds a learning base using past queries and then predict the response time of the query based on nearest neighbor approach. But such models lack in accurately predicting the response time of the query with linear increase in the size of the data over the period of time.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for predicting an Elapsed Response Time (ERT) of a query to be executed in a production database and the concepts are further described below in the detailed description. This summary is not intended to identify essential features of the disclosure nor is it intended for use in determining or limiting the scope of the disclosure.

In one implementation, a system for predicting an Elapsed Response Time (ERT) of a query to be executed in a production database is disclosed. In one aspect, the system may comprise a processor and a memory coupled to the processor. The processor may execute a plurality of modules present in the memory. The plurality of modules may further comprise a db emulator module, an execution plan generation module, an execution plan generation module, a time determination module, and an ERT prediction module. The db emulator module may create an emulated database, corresponding to a production database, in a development environment based on empty schema derived by extrapolating statistical information from the development environment. The execution plan generation module may generate a query execution plan of the query based on the emulated database. The query execution plan indicates one or more sub-queries, of the query, to be executed on the production database. In one aspect, each sub-query may be associated with operational parameters. The query classifying module may classify each sub-query based on the operational parameters into at least one type of scan. Examples of the type of scan may include, but not limited to, a full table scan, a primary index scan, a fast index scan and a non-unique index scan. The time determination module may execute each sub-query on a test database, present in the development environment, to determine an Input Output (IO) access time corresponding to each sub-query, and an operator time corresponding to each sub-query. The IO access time may be predicted based on the classification. The operator time may be predicted based on one or more operators present in each sub-query. The ERT prediction module may predict the ERT of the query to be executed in the production database based on the IO access time corresponding to each sub-query, the operator time corresponding to each sub-query, and a network time. The network time indicates time required to transmit data retrieved upon executing each sub-query over a network.

In another implementation, a method for predicting an Elapsed Response Time (ERT) of a query to be executed in a production database. In order to predict the ERT of a query to be executed in a production database, initially, an emulated database, corresponding to a production database, in a development environment may be created based on empty schema derived by extrapolating statistical information from the development environment. Upon creating the emulated database, a query execution plan of the query may be generated based on the emulated database. The query execution plan indicates one or more sub-queries, of the query, to be executed on the production database. In one aspect, each sub-query may be associated with operational parameters. After generating the query execution plan, each sub-query may be classified based on the operational parameters into at least one type of scan. Examples of the type of scan may include, but not limited to, a full table scan, a primary index scan, a fast index scan and a non-unique index scan. Subsequent to the classification of the each sub-query, each sub-query may be executed on a test database, present in the development environment, to determine an Input Output (IO) access time corresponding to each sub-query, and an operator time corresponding to each sub-query. In one aspect, the IO access time may be predicted based on the classification. In one aspect, the operator time may be predicted based on one or more operators present in each sub-query. Once the IO access time, and the operator time is determined, the ERT of the query, to be executed in the production database, may be predicted based on the IO access time corresponding to each sub-query, the operator time corresponding to each sub-query, and a network time. The network time indicates time required to transmit data retrieved upon executing each sub-query over a network. In one aspect, the aforementioned method for predicting the ERT of the query to be executed in the production database is performed by a processor using programmed instructions stored in a memory.

In yet another implementation, non-transitory computer readable medium embodying a program executable in a computing device for predicting an Elapsed Response Time (ERT) of a query to be executed in a production database. The program may comprise a program code for creating an emulated database, corresponding to a production database, in a development environment based on empty schema derived by extrapolating statistical information from the development environment. The program may further comprise a program code for generating a query execution plan of the query based on the emulated database. The query execution plan indicates one or more sub-queries, of the query, to be executed on the production database. In one aspect, each sub-query comprises may be associated with operational parameters. The program may further comprise a program code for classifying each sub-query based on the operational parameters into at least one type of scan. Examples of the type of scan may include, but not limited to, a full table scan, a primary index scan, a fast index scan and a non-unique index scan. The program may further comprise a program code for executing each sub-query on a test database, present in the development environment, to determine an Input Output (IO) access time corresponding to each sub-query, and an operator time corresponding to each sub-query. The IO access time may be predicted based on the classification. The operator time may be predicted based on one or more operators present in each sub-query. The program may further comprise a program code for predicting the ERT of the query to be executed in the production database based on the IO access time corresponding to each sub-query, the operator time corresponding to each sub-query, and a network time. The network time indicates time required to transmit data retrieved upon executing each sub-query over a network.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
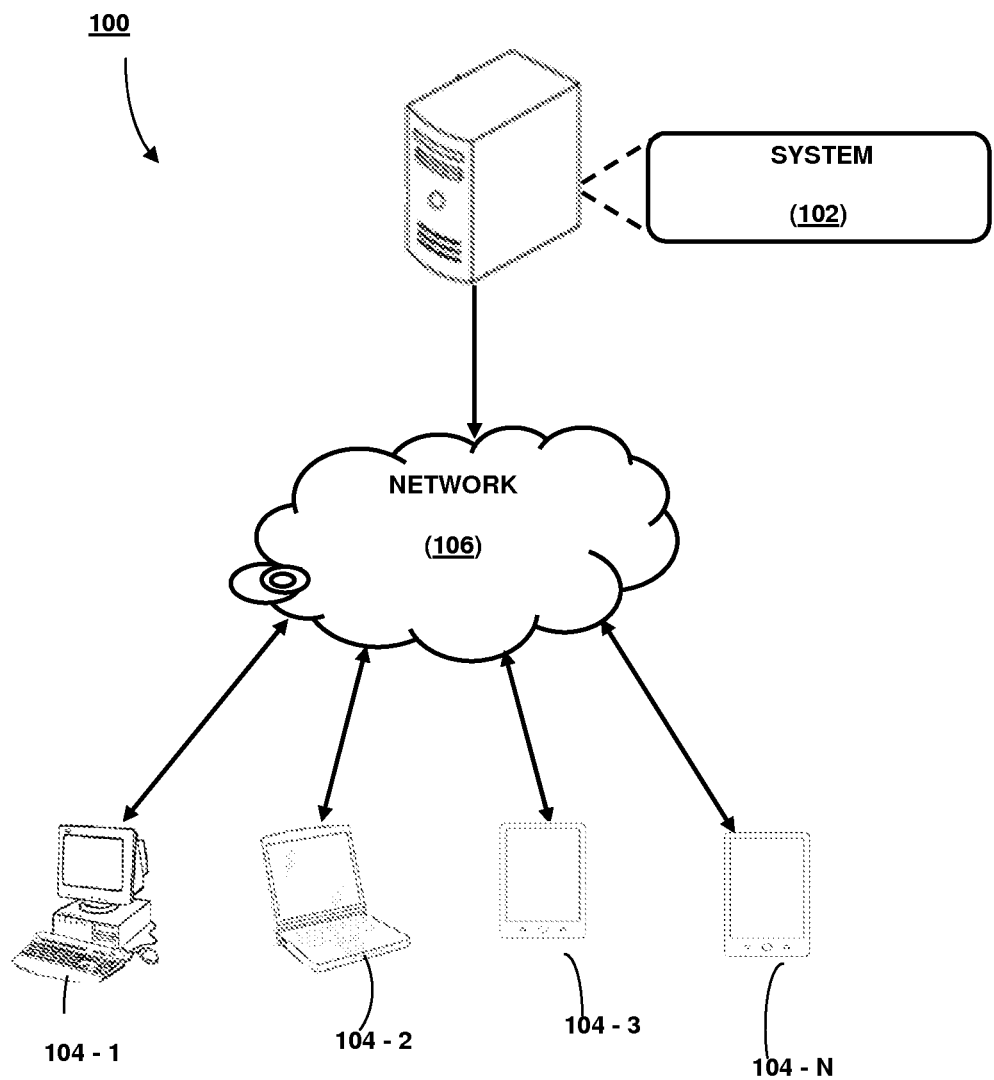
FIG. 1 illustrates a network implementation of a system for predicting an Elapsed Response Time (ERT) of a query to be executed in a production database is shown, in accordance with an embodiment of the present disclosure.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Systems and methods for predicting an Elapsed Response Time (ERT) of a query to be executed in a production database are described. In order to predict the ERT, the present disclosure explains an intuitive approach that creates an emulated database in a development environment based on empty schema. In one aspect, the emulated database may be created by extrapolating statistical information from the development environment. The system emulates a large sized database by linearly extrapolating the statistical information sensitive to data size. Examples of the statistical information may comprise tables, blocks, index blocks and data values. It may be understood that the ERT may depend on performance of a database, relative size of the database, data size, relative size of memory available for database operators such as joins, query design, database schema and the query execution plan. Among all of the above, the query execution plan, the relative size of database, and the relative size of memory may change with increase in data size.

Once the emulated database is created, the system further generates a query execution plan of the query based on the emulated database. The query execution plan indicates one or more sub-queries, of the query, to be executed on a production database. Each sub-query is associated with operational parameters. Examples of the operational parameters may include, but not limited to, table, mode of access, cardinality, output size, cost, and Input Output cost. After generating the query execution plan, each sub-query may be classified based on the operational parameters. In one aspect, each sub-query may be classified into at least one type of scan. Examples of the type of scan may include, but not limited to, a Full table scan, a fast index scan, a primary index scan and a non-unique index scan based on the mode of data access in the table. Further, each sub-query may be executed on a test database, present in the development environment, to determine Input Output (IO) access time corresponding to each sub-query, and an operator time corresponding to each sub-query.

Since the system may have some network latency time to transmit data retrieved upon executing each sub-query over a network, the ERT of the query may be predicted based on aggregation of the IO access time corresponding to each sub-query, the operator time corresponding to each sub-query, and a network time. In one aspect, the ERT of the query may be predicted by aggregating the IO access time corresponding to each sub-query and the operator time corresponding to each sub-query to determine a predicted sub-query execution time and the predicted sub-query execution time and the network time to determine the ERT. The formula for predicting the ERT is $$\text{Predicted } ERT = \text{Network Time} + \sum_{all\ steps} \text{predicted step execution time} \quad (1)$$

In one aspect, the system further defines a performance benchmark value for the query to be executed in the production database. The performance benchmark value may be defined based on the ERT, the predicted sub-query execution time, Input Output Cost, logical reads, physical reads, cardinality, and output size.

While aspects of described system and method for predicting an Elapsed Response Time (ERT) of a query to be executed in a production database may be implemented in any number of different computing systems, environments, and/or configurations, the embodiments are described in the context of the following exemplary system.

Referring now to FIG. 1, a network implementation 100 of a system, hereinafter referred to as a system 102, for predicting an Elapsed Response Time (ERT) of a query to be executed in a production database is disclosed. In one embodiment, the system 102 creates an emulated database in a development environment based on empty schema derived by extrapolating statistical information from the development environment. Upon creating the emulated database, the system 102 generates a query execution plan of the query based on the emulated database. After generating the query execution plan, the system 102 classifies each sub-query based on the operational parameters into at least one of a full table scan, a primary index scan, a fast index scan and a non-unique index scan. Subsequent to the classification of the each sub-query, the system 102 executes each sub-query on a test database, present in the development environment, to determine an Input Output (IO) access time, and an operator time corresponding to each sub-query. Once the IO access time, and the operator time is determined, the system 102 predicts the ERT of the query to be executed in a production database based on the IO access time, the operator time, and a network time. The network time indicates time required to transmit data retrieved upon executing each sub-query over a network.

Although the present disclosure is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 ... 104-N, collectively referred to as user 104 hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
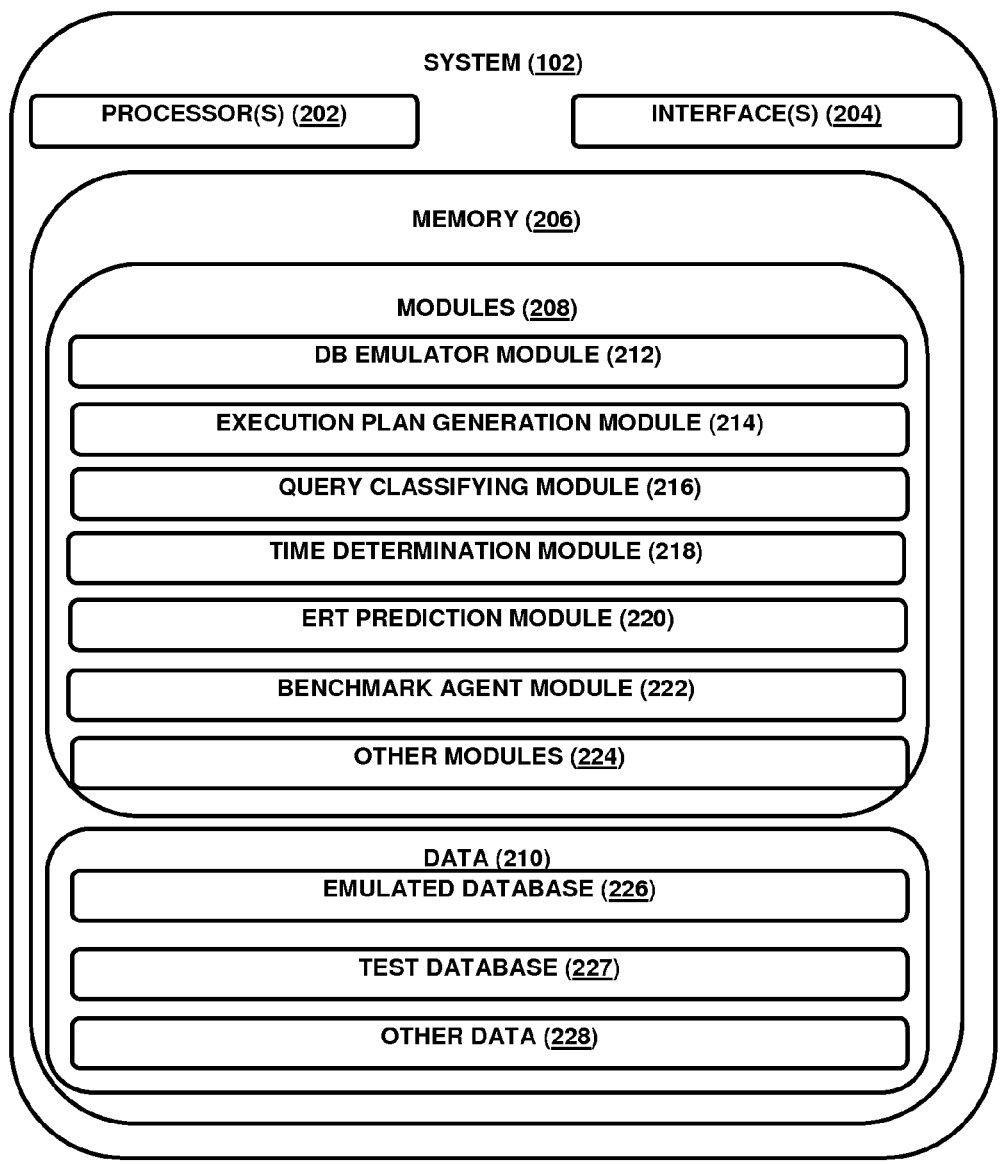
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a db emulator module 212, an execution plan generation module 214, a query classifying module 216, a time determination module 218, an ERT prediction module 220, a benchmark agent module 222, and other modules 224. The other modules 224 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include an emulated database 226, a test database 227, and other data 228. The other data 228 may include data generated as a result of the execution of one or more modules in the other modules 224.

In one implementation, at first, a user may use the client devices 104 to access the system 102 via the I/O interface 204. The user may register themselves using the I/O interface 204 in order to use the system 102. In one aspect, the user may accesses the I/O interface 204 of the system 102 for predicting an Elapsed Response Time (ERT) of a query to be executed in a production database. In order to predict the ERT, the system 102 may employ the plurality of modules i.e. the db emulator module 212, the execution plan generation module 214, the query classifying module 216, the time determination module 218, the ERT prediction module 220, and the benchmark agent module 222. The detailed working of the plurality of modules is described below.

Further referring to FIG. 2, it may be understood that the production database may comprise large volume of data. Since the production database contains the large volume of data, predicting the ERT of the query may be time consuming as the query is executed on the production database containing the large volume of data. It may be further understood that the ERT may depend on the performance of a database, relative sizes of the database and relative memory size available for the database operators such as joins, query design, database schema and the query execution plan. Among all of the above, the query execution plan, the relative memory size of the database, and the relative memory size available for the database operators majorly impacts on the database and further change with increase in the volume of data. In order to predict the ERT, the db emulator module 212 creates an emulated database 226 in a development environment based on empty schema. The emulated database 226 is content less however facilitates to generate the query execution plan based on statistical information. In one aspect, the empty schema may be derived by extrapolating the statistical information from the development environment. Examples of the statistical information may include, but not limited to, tables, blocks, index blocks and data values.

Subsequent to the generation of the emulated database 226, the execution plan generation module 214 generates the query execution plan of the query based on the emulated database. The execution plan generation module 214 uses table, index and column of the emulated database to generate the query execution plan. The query execution plan indicates one or more sub-queries, of the query, to be executed on a production database, wherein the one or more sub-queries are collated to derive the query. Each sub-query is executed independently in the background to retrieve respective data from the production database. In one aspect, each sub-query may be associated with operational parameters. The operational parameters may include, but not limited to, table, mode of access, cardinality, output size, and Input Output cost.

In one embodiment, the cardinality indicates a count of rows returned upon executing the query. The cardinality further determines size of the output from a step to its successor step. In one example, consider a query as below:

$$\text{select sum(s\_acctbal) from supplier where } s\_suppkey=ps\_suppkey \quad (1)$$

Figure 3:
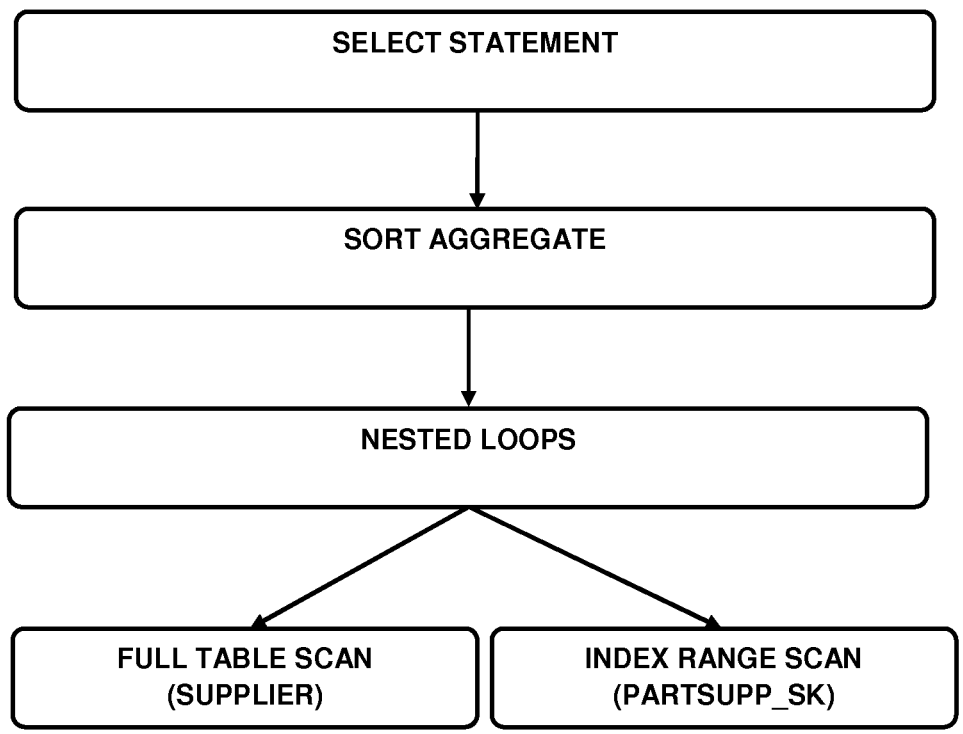
FIG. 3 illustrates an example, in accordance with an embodiment of the present disclosure.

The execution plan generated by the execution plan generation module 214 for the above mentioned query (1) is shown in FIG. 3. Based on the query (1), it may be understood that the query (1) is derived to retrieve "sum" of "account balance" from two tables i.e. "supplier" and "partsupp_sk" where "suppkey" (primary) present in "supplier" is equivalent to "ps_suppkey" (foreign key) present in "partsupp_sk". In order to generate the query execution plan, the execution plan generation module 214 determines one or more sub-queries present in the query (1). The one or more sub-queries present in the query (1) are associated to select statement, aggregation of the retrieved data (sum), and nested loops associated to tables i.e. full table scan in "supplier" and index range scan in "partsupp_sk".

In one embodiment, after generating the query execution plan, the execution plan generation module 214 maps each sub-query into an equivalent independent query. In one aspect, each sub-query mapped is said to be equivalent to the corresponding sub-query of the query when the execution of a sub-query satisfies at least one of a following mentioned parameters.

a) Same execution time.
b) Same number of outputted rows.
c) Same number of logical reads and physical reads.

For example, consider the query (1) same as aforementioned. The query (1) may be mapped into two sub-queries i.e.

$$\text{<select /*+FULL */ s\_acctbal, s\_suppkey from supplier>} \quad (2), \text{ and}$$

$$\text{<select /*+index(partsupp\_sk) */ count(*) from partsupp where ps\_suppkey>0>} \quad (3)$$

In one embodiment, the execution plan generation module 214 does not break hash join query/step into separate independent queries, however keep it intact with its two tables ("supplier", "partsupp_sk") and pass it to the query classifying module 216.

The query classifying module 216 classifies each sub-query based on the operational parameters into at least one type of scan. Examples of the type of scan may include, but not limited to a full table scan, a primary index scan, a fast index scan and a non-unique index scan. In one aspect, each sub-query may be classified to determine Input Output (IO) access time corresponding to each sub-query and operator time corresponding to each sub-query. In one embodiment, the query classifying module 216 classifies each sub-query based on data access pattern impacting the IO access time of data retrieved either from disk, Operating System cache or database cache. In order to determine the IO access time corresponding to each sub-query, the time determination module 218 executes each sub-query on the emulated database 226 based on the classification. It may be noted that the IO access time may be determined based on a methodology/technique disclosed in an Indian Patent application 2853/MUM/2013, incorporated as a reference.

The time determination module 218 may further identifies one or more operators, present in each sub-query, impacting the operator time while retrieving the data either from disk, Operating System cache or database cache. Examples of the one or more operators may include, but not limited to, Aggregate, Hash, Nested, Sort, Merge and Hash. Upon identifying the one or more operators, the time determination module 218 executes each sub-query on a test database 227, present in the development environment, to determine the operator time corresponding to each sub-query.

In one example, consider a query, associated to two tables ($T_1$ and $T_2$), comprises 'Sort' and 'Merge' operators. A Sort-Merge join execution time on large data size 'l', is sorting time of rows returned from both the tables $T_1$ and $T_2$. The sorting time are indicated by $(ST_L^{T1})$ and $(ST_L^{T2})$ which include their access times and merging time ($MT_L$) of the sorted rows as given in EQ1.

$$SMT_L = ST_L^{T1} + ST_L^{T2} + MT_S * \frac{L}{S} \qquad \text{EQ1}$$

In one aspect, the merging time is linear to the number of merging rows and is linearly extrapolated from merging time at small data size ($MT_S$). If the number of rows accessed from the tables for sorting is invariant to the data size, the join execution time will be linear to increase in data size. The sorting time is linear unless it spill over the disk. The number of spilled operations over disk depends on the sort implementation, so cost associated to the emulated database 226 may be considered estimating the operator time. The 'Sort' operator cost ($SC_L$) at size 'L' is calculated as difference between the sort operator cost and the table access. Similarly, it is calculated for small size 'S'.

In another example, consider a query, associated to two tables ($T_1$ and $T_2$), comprises 'Nested Loop Join' operator. The execution time ($NLT_L$) of the Nested Loop Join depends on the first table"s, $T_1$, access time; number of rows filtered from the first table ($T_1$) and repeated index scan access time of the second table ($T_2$), where the access pattern in the second table ($T_2$) is driven by the values returned from the first table ($T_1$). The execution time ($NLT_L$) at size 'L', is summation of the IO access time corresponding to $T_1$ ($IO^{T1}_L$) and $T_2$ ($IO^{T2}_L$) for number or rows returned from $T_1$ ($N_{Rows\,L}^{T1}$) and time for doing matching operation for nested join ($NoT_L$). The last component can be linearly extrapolated for uniform data growth. In one aspect, the execution time ($NLT_L$) may be determined by using the equation EQ2 as mentioned below:

$$NLT_L = IO_L^{T1} + IO_L^{T2} \text{ for } Nrows_L^{T1} + NoT_S * \frac{L}{S} \qquad \text{EQ2}$$

Thus, in this manner, the time determination module 218 determines the IO access time and the operator time for each sub-query.

Subsequent to the determination of the IO access time corresponding to each sub-query and the operator time corresponding to each sub-query, the ERT prediction module 220, predicts the ERT of the query to be executed in the production database present in a production environment. The ERT prediction module 220 may predict the ERT based on the IO access time corresponding to each sub-query, the operator time corresponding to each sub-query, and a network time. In one aspect, the network time indicates time required to transmit data retrieved upon executing each sub-query over a network. In one embodiment, the network time corresponding to the query may depend upon size of the data retrieved upon executing the query, wherein the size indicates product of number of rows and size of output row (i.e. number of rows*size of output row). In one embodiment, the ERT prediction module 220 predicts the ERT by aggregating the IO access time corresponding to each sub-query and the operator time corresponding to each sub-query to determine a predicted sub-query execution time thereby aggregating the predicted sub-query execution time and the network time to determine the ERT. In statistical expressions, the ERT prediction module 220 predicts the ERT by using a below mentioned formula:

$$\text{ERT=Network time} + \Sigma \text{Predicted sub-query execution time} \qquad (4)$$

In one embodiment, the benchmark agent module 222 may define a performance benchmark value for the query to be executed in the production environment. The performance benchmark value is defined based on the ERT, the predicted sub-query execution time, IO Cost, logical reads, physical reads, cardinality, and output size. Thus, in this manner, the aforementioned methodology facilitates to predict the ERT of the query to be executed in the production database containing the large volume of data.

Figure 4:
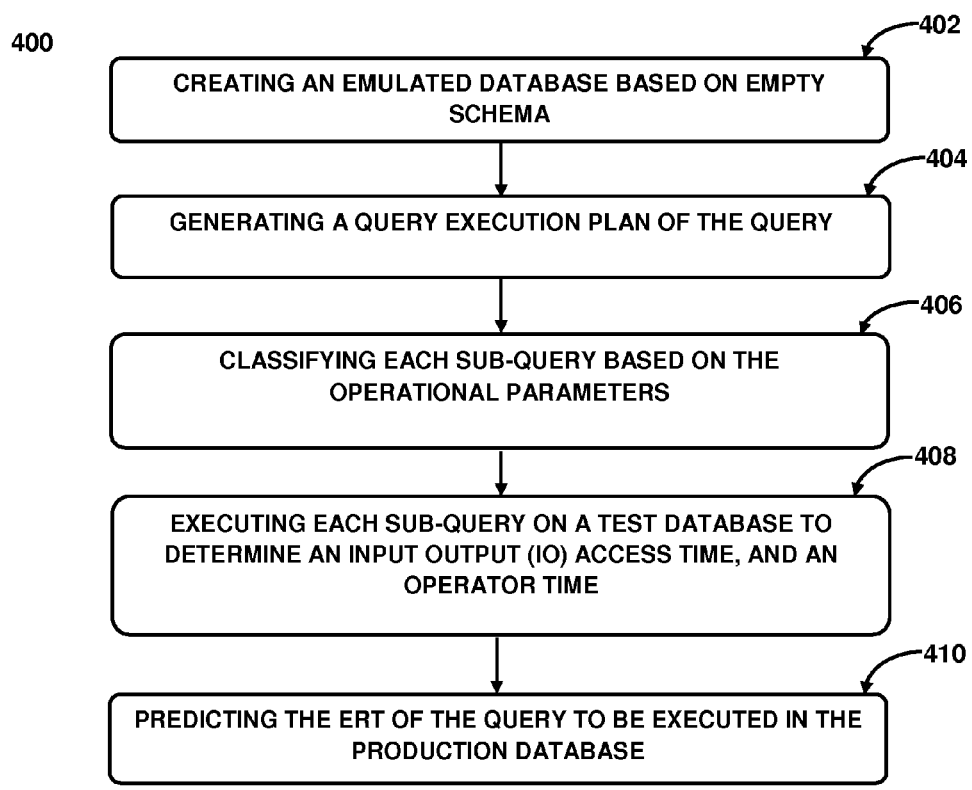
FIGS. 4 and 5 illustrate a method for predicting the ERT of the query to be executed in the production database, in accordance with an embodiment of the present disclosure.

Referring now to FIG. 4, a method 400 for predicting an Elapsed Response Time (ERT) of a query to be executed in a production database is shown, in accordance with an embodiment of the present disclosure. The method 400 may be described in the general context of computer executable instructions. Generally, computer executable instructions can include routines, programs, objects, components, data structures, procedures, modules, functions, etc., that perform particular functions or implement particular abstract data types. The method 400 may be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the disclosure described herein. Furthermore, the method can be implemented in any suitable hardware, software, firmware, or combination thereof. However, for ease of explanation, in the embodiments described below, the method 400 may be considered to be implemented in the above described in the system 102.

At block 402, an emulated database may be created in a development environment based on empty schema derived by extrapolating statistical information from the development environment. In one implementation, the emulated database may be created by the db emulator module 212.

At block 404, a query execution plan of the query may be generated based on the emulated database. In one aspect, the query execution plan indicates one or more sub-queries, of the query, to be executed on a production database. In one aspect, each sub-query may be associated with operational parameters. In one implementation, the query execution plan of the query may be generated by the execution plan generation module 214.

At block 406, each sub-query may be classified based on the operational parameters into at least one type of scan.

Examples of the type of scan may include, but not limited to, a full table scan, a primary index scan, a fast index scan and a non-unique index scan. In one implementation, each sub-query may be classified by the query classifying module 216.

At block 408, each sub-query may be executed on a test database, present in the development environment, to determine an Input Output (IO) access time corresponding to each sub-query, and an operator time corresponding to each sub-query. In one aspect, the IO access time corresponding to each sub-query may be predicted based on the classification. In one aspect, the operator corresponding to each sub-query time may be predicted based on one or more operators present in each sub-query. In one implementation, each sub-query may be executed by the time determination module 218.

At block 410, the ERT of the query to be executed in the production database may be predicted based on the IO access time corresponding to each sub-query, the operator time corresponding to each sub-query, and a network time. In one aspect, the network time indicates time required to transmit data retrieved upon executing each sub-query over a network. In one implementation, the ERT of the query to be executed in the production database may be predicted by the ERT prediction module 220.

Figure 5:
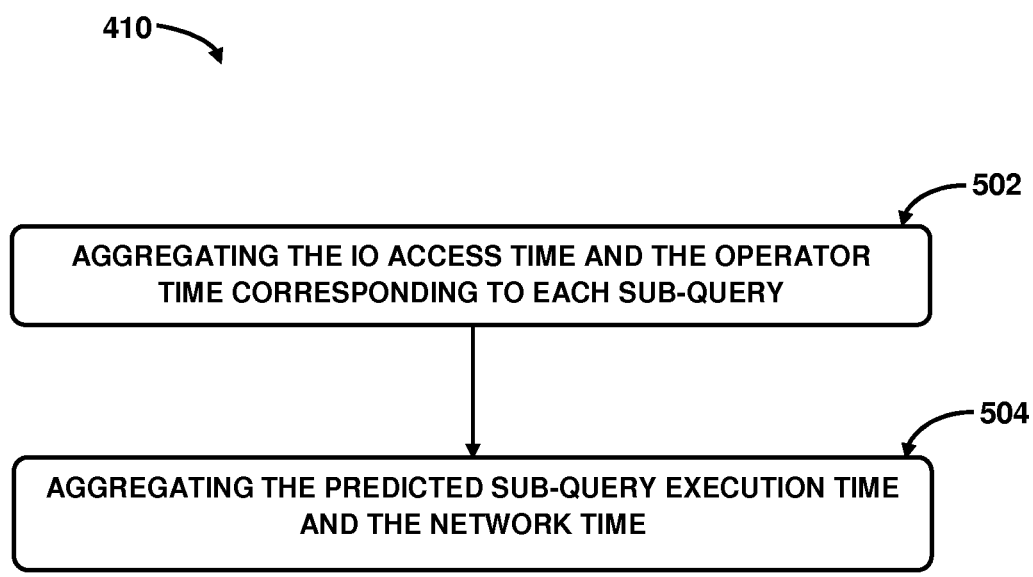

Referring now to FIG. 5, a method 410 for predicting the ERT is shown, in accordance with an embodiment of the present subject matter.

At block 502, the IO access time and the operator time corresponding to each sub-query may be aggregated to determine a predicted sub-query execution time. In one implementation, the IO access time corresponding to each sub-query and the operator time corresponding to each sub-query may be aggregated by the ERT prediction module 220.

At block 504, the predicted sub-query execution time and the network time may be aggregated to determine the ERT. In one implementation, the predicted sub-query execution time and the network time may be aggregated by the ERT prediction module 220.

Although implementations for methods and systems for predicting an Elapsed Response Time (ERT) of a query to be executed in a production database have been described in language specific to structural features and/or methods, it is to be understood that the appended claims are not necessarily limited to the specific features or methods described. Rather, the specific features and methods are disclosed as examples of implementations for predicting the ERT of the query.

Exemplary embodiments discussed above may provide certain advantages. Though not required to practice aspects of the disclosure, these advantages may include those provided by the following features.

Some embodiments enable a system and a method to predict Elapsed response Time (ERT) of a query executed on a database containing a large volume of data.

Some embodiments enable a system and a method to estimate SQL operator time spent in a query on varying size database.

Some embodiments enable a system and a method to predict the ERT for complex query involving cascading of different join operators, wherein the complex query is classified into one or more sub-queries thereby aggregating IO access time, operator time, pertaining to each sub-query, along with network time.

What is claimed is:

1. A method for predicting an Elapsed Response Time (ERT) of a query to be executed in a production database, the method comprising:
    creating, by a processor, an emulated database in a development environment based on empty schema derived by extrapolating statistical information sensitive to data size from the development environment, the emulated database corresponding to a production database containing voluminous data;
    generating, by the processor, a query execution plan of a query based on the emulated database, wherein the query execution plan indicates one or more sub-queries of the query, the sub-queries to be executed on the production database, and wherein each sub-query is associated with operational parameters;
    classifying, by the processor, each sub-query into at least one type of scan based on the operational parameters, wherein the type of scan comprises a full table scan, a primary index scan, a fast index scan, and a non-unique index scan;
    executing, by the processor, each sub-query on a test database of the development environment to determine an Input Output (TO) access time corresponding to each sub-query and an operator time corresponding to each sub-query, wherein the IO access time is determined based on the classification, and wherein the operator time is determined based on one or more operators of each sub-query;
    predicting, by the processor, the ERT of the query to be executed in the production database based on the IO access time, the operator time, and a network time, wherein the network time indicates a time required to transmit data retrieved upon executing each sub-query over a network; and
    defining a performance benchmark value for the query, wherein the performance benchmark value is defined based on the ERT, the predicted sub-query execution time, an IO Cost, logical reads, physical reads, a cardinality, and an output size.

2. The method of claim 1, wherein the statistical information comprises at least one of tables, blocks, index blocks, or data values.

3. The method of claim 1, wherein the operational parameters comprise at least one of a table, a mode of access, a cardinality, an output size, a cost, or an Input Output cost.

4. The method of claim 1, wherein the one or more operators comprise at least one of Aggregate, Hash, Nested, Sort, Merge and Hash.

5. The method of claim 1, wherein the ERT is predicted by:
    aggregating the IO access time corresponding to each sub-query and the operator time corresponding to each sub-query to determine a predicted sub-query execution time; and
    aggregating the predicted sub-query execution time and the network time to determine the ERT.

6. A system for predicting an Elapsed Response Time (ERT) of a query to be executed in a production database, the system comprising:
    a processor; and
    a memory coupled to the processor, wherein the processor executes a plurality of modules stored in the memory, the plurality of module comprising:
    a database emulator module for creating an emulated database in a development environment based on empty schema derived by extrapolating statistical information sensitive to data size from the development environment, the emulated database corresponding to a production database containing voluminous data;

an execution plan generation module for generating a query execution plan of a query based on the emulated database, wherein the query execution plan indicates one or more sub-queries of the query, the sub-queries to be executed on the production database, and wherein each sub-query comprises is associated with operational parameters;

a query classifying module for classifying each sub-query into at least one type of scan operational parameters, wherein the type of scan comprises a full table scan, a primary index scan, a fast index scan, and a non-unique index scan;

a time determination module for executing each sub-query on a test database of the development environment to determine an Input Output (TO) access time corresponding to each sub-query and an operator time corresponding to each sub-query, wherein the IO access time is determined based on the classification, and wherein the operator time is determined based on one or more operators of each sub-query;

an ERT prediction module for predicting the ERT of the query to be executed in the production database based on the IO access time, the operator time, and a network time, wherein the network time indicates a time required to transmit data retrieved upon executing each sub-query over a network; and a benchmark agent module for defining a performance benchmark value for the query, wherein the performance benchmark value is defined based on the ERT, the predicted sub-query execution time, an IO Cost, logical reads, physical reads, a cardinality, and an output size.

7. The system of claim 6, wherein the statistical information comprises at least one of tables, blocks, index blocks, or data values.

8. The system of claim 6, wherein the operational parameters comprise at least one of a table, a mode of access, a cardinality, an output size, a cost, or an Input Output cost.

9. The system of claim 6, wherein the one or more operators comprise at least one of Aggregate, Hash, Nested, Sort, Merge and Hash.

10. The system of claim 6, wherein the ERT prediction module predicts the ERT by:
aggregating the IO access time corresponding to each sub-query and the operator time corresponding to each sub-query to determine a predicted sub-query execution time; and
aggregating the predicted sub-query execution time and the network time to determine the ERT.

11. A non-transitory computer readable medium comprising a program executable in a computing device for predicting an Elapsed Response Time (ERT) of a query to be executed in a production database, the program comprising:

a program code for creating an emulated database in a development environment based on empty schema derived by extrapolating statistical information sensitive to data size from the development environment, the emulated database corresponding to a production database containing voluminous data;

a program code for generating a query execution plan of a query based on the emulated database, wherein the query execution plan indicates one or more sub-queries of the query, the sub-queries to be executed on the production database, and wherein each sub-query comprises is associated with operational parameters;

a program code for classifying each sub-query into at least one type of scan based on the operational parameters, wherein the type of scan comprises a full table scan, a primary index scan, a fast index scan, and a non-unique index scan;

a program code for executing each sub-query on a test database of the development environment to determine an Input Output (TO) access time corresponding to each sub-query and an operator time corresponding to each sub-query, wherein the IO access time is determined based on the classification, and wherein the operator time is determined based on one or more operators of each sub-query;

a program code for predicting the ERT of the query to be executed in the production database based on the IO access time, the operator time, and a network time, wherein the network time indicates a time required to transmit data retrieved upon executing each sub-query over a network; and a program code for defining a performance benchmark value for the query, wherein the performance benchmark value is defined based on the ERT, the predicted sub-query execution time, an IO Cost, logical reads, physical reads, a cardinality, and an output size.

12. The medium of claim 11, wherein the operational parameters comprise at least one of a table, a mode of access, a cardinality, an output size, a cost, or an Input Output cost.

13. The medium of claim 11, wherein the one or more operators comprise at least one of Aggregate, Hash, Nested, Sort, Merge and Hash.

14. The medium of claim 11, wherein the program code for predicting the ERT predicts the ERT by:
aggregating the IO access time corresponding to each sub-query and the operator time corresponding to each sub-query to determine a predicted sub-query execution time; and
aggregating the predicted sub-query execution time and the network time to determine the ERT.

* * * * *